J. N. GROSS.
CUTTER AND CHOPPER.
APPLICATION FILED JULY 24, 1917.
1,280,447.
Patented Oct. 1, 1918.
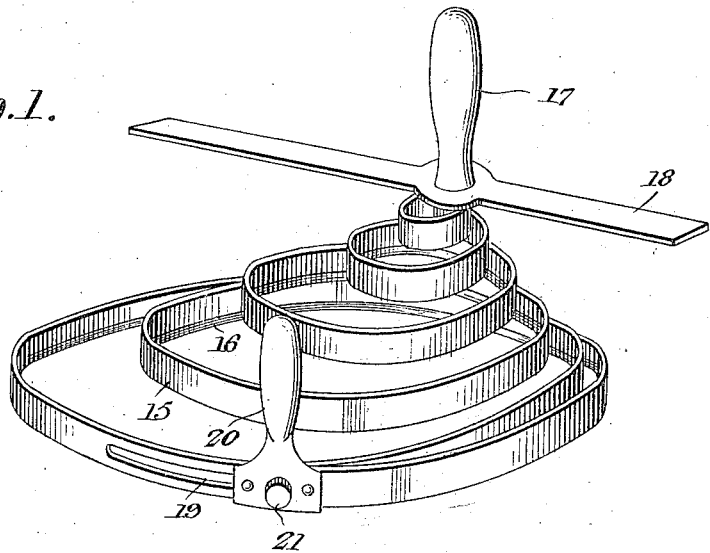
Fig. 1.
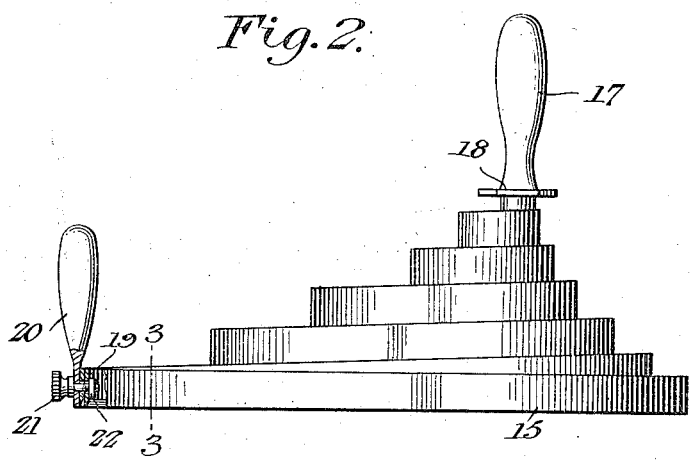
Fig. 2.
Fig. 3.
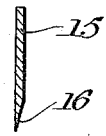
Inventor
John N. Gross.
By Victor J. Evans
Attorney

UNITED STATES PATENT OFFICE.

JOHN N. GROSS, OF GISCOME, BRITISH COLUMBIA, CANADA.

CUTTER AND CHOPPER.

1,280,447.

Specification of Letters Patent.

Patented Oct. 1, 1918.

Application filed July 24, 1917. Serial No. 182,587.

*To all whom it may concern:*

Be it known that I, JOHN N. GROSS, a citizen of the United States of America, residing at Giscome, in the Province of British Columbia and Dominion of Canada, have invented new and useful Improvements in Cutters and Choppers, of which the following is a specification.

This invention relates to devices or utensils for cutting and chopping vegetables, fruit, suet and the like, and it has for its object to produce a device of this class in which the cutting member will consist of a spirally coiled spring, one edge of which is sharpened to produce a cutting edge of great length and, therefore, of great effectiveness.

A further object of the invention is to produce a utensil of the class described having handles whereby it may be conveniently manipulated.

A further object of the invention is to produce a device or utensil of the class described having a presser arm whereby the coils of the spring may be effectively pressed in engagement with the material that is to be cut.

A further object of the invention is to produce a utensil of the character described having means whereby the spiral spring coil may be adjusted to vary the relative dimensions of the individual whorls and the distance therebetween, thereby enabling material to be cut or chopped fine or coarse, as may be desired.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being however, understood that no limitation is necessarily made to the precise structural details therein exhibited, but that changes, alterations and modifications within the scope of the claims may be resorted to when desired.

In the drawing:

Figure 1 is a perspective view of a device constructed in accordance with the invention.

Fig. 2 is a view in side elevation of the same.

Fig. 3 is a sectional detail view taken on the line 3—3 in Fig. 2.

Corresponding parts in the several figures are denoted by like characters of reference.

A spring blade 15 of proper length is treated to produce at the lower edge thereof a cutting edge 16, said blade being coiled spirally and provided at its inner end with a handle 17 which is attached to or connected therewith in any convenient manner, said handle being provided with a cross bar 18. The blade 15 is coiled to produce a spiral, and it is provided near its outer end with a longitudinal slot 19. Secured to the blade 15 at the outer extremity thereof is a handle 20, and a set screw 21 passing therethrough extends through the slot 19 and is provided with a nut 22, whereby the outer end portion of the spring is securely connected with the slotted portion thereof, it being evident that by moving the set screw along the slot 19 the spring may be loosened or tensioned, and the dimensions of the whorls as well as the spaces therebetween be varied.

In operation, the device is placed over the material to be chopped, it being held steady with one hand by means of the handle 20, while the other handle 17 is manipulated by the other hand of the operator to produce a cutting action which may be repeated as often as is necessary in order to produce the desired result. The cross bar 18 which extends across the whorls of the device will serve to depress the same and to force them through the material that is to be chopped.

Having thus described the invention, what is claimed as new, is:—

1. A cutting and chopping implement comprising a spiral spring blade having its outer end connected to the contiguous convolution and provided at the outer end and also at the inner end with handles.

2. A cutting and chopping implement comprising a spiral spring blade having handles at its inner and outer ends, the whorl of the blade next the outer end being provided with a slot and said outer end being provided with a set screw which extends through and is movable in said slot to vary the diameter of the blade and to also secure the blade when set at any desired diametrical adjustment.

In testimony whereof I affix my signature.

JOHN N. GROSS.